May 19, 1959 C. J. YATES 2,886,917
SOAP CONTAINER
Filed Nov. 26, 1957 2 Sheets-Sheet 1

CLIFTON J. YATES
INVENTOR

BY *CA Snow &Co.*
ATTORNEYS.

May 19, 1959
C. J. YATES
2,886,917
SOAP CONTAINER
Filed Nov. 26, 1957
2 Sheets-Sheet 2
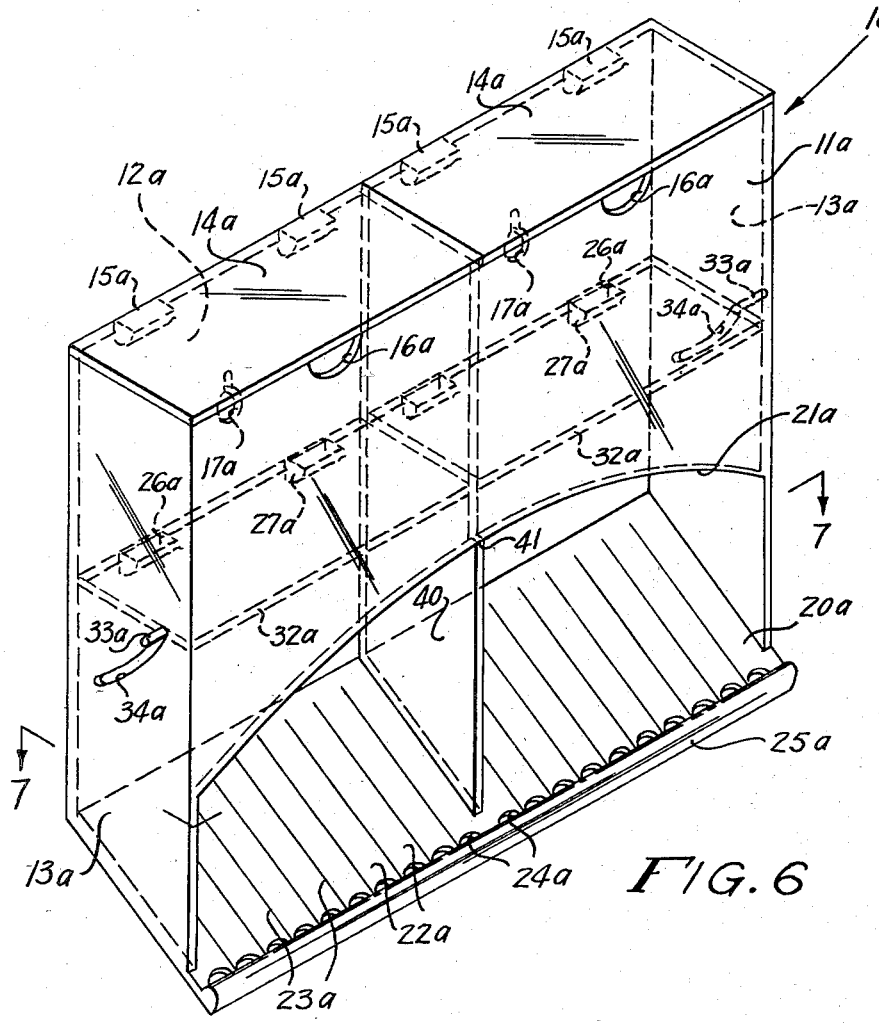
FIG. 6
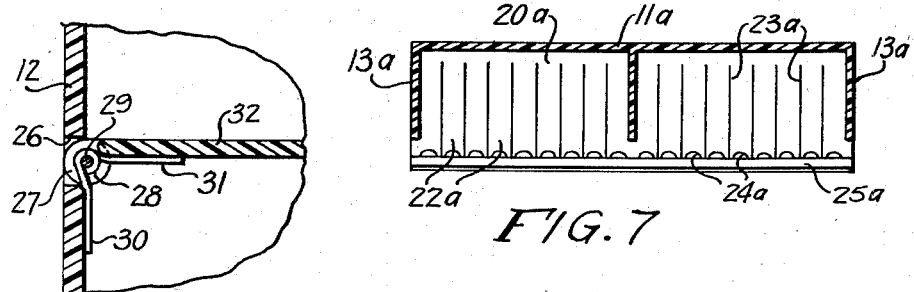
FIG. 5
FIG. 7
CLIFTON J. YATES
INVENTOR
BY
ATTORNEYS.

United States Patent Office 2,886,917
Patented May 19, 1959

2,886,917

SOAP CONTAINER

Clifton J. Yates, San Francisco, Calif.

Application November 26, 1957, Serial No. 699,035

2 Claims. (Cl. 45—28)

This invention relates to a soap container, and has as its primary object the provision of a receptacle in which a cake of soap may be stored, the receptacle having a tiltable bottom, and a lower portion including a front opening from which the soap may be removed after tilting the bottom, to drop the soap into the lower portion of the receptacle.

The primary object of this invention is the provision of an improved container for protecting a cake of soap, and placing the same out of the way when not in use, and from which the soap may be readily discharged to accessible position for use when desired.

A further object of the invention is the provision of a device of this character which is transparent, in order that the size of a cake of soap contained therein may be readily determined at a glance, and hence replaced when necessary.

Still another object of the invention is the provision of a device of this character which may be supported on a vertical surface, as on a wall or the like, at the most convenient height for the user.

A further object of the invention is the provision of such a device which is provided with an inclined bottom surface at the lower portion of the receptacle, having ridges thereon for the support of the soap, and drainage openings at the lowermost portion.

A further object of the invention is the provision of a raised portion at the front edge of such inclined bottom surface, to prevent the soap from sliding out of the receptable, when dropped from the closed container portion of the receptacle.

A more specific object of the invention is the provision of such a device which may be constructed in multiple units for the dispensing of more than one cake of soap selectively, as desired.

A further object of the invention is the provision of a device of this character which is sturdy and durable in construction, reliable and efficient in operation, and relatively simple and inexpensive to manufacture and assemble.

Other objects reside in the combinations of elements, arrangements of parts, and features of construction, all as will be more fully pointed out hereinafter, and shown in the accompanying drawing wherein there is disclosed a preferred embodiment of this inventive concept.

In the drawing:

Fig. 5 is an enlarged fragmentary sectional view taken substantially along the line 5—5 of Fig. 3 as viewed in the direction indicated by the arrows.

Fig. 6 is a perspective view of a modified form of this invention; and

Fig. 7 is a sectional view taken substantially along the line 7—7 of Fig. 6, as viewed in the direction indicated by the arrows, on a reduced scale.

Similar reference characters refer to similar parts throughout the several views of the drawings.

Figure 1:
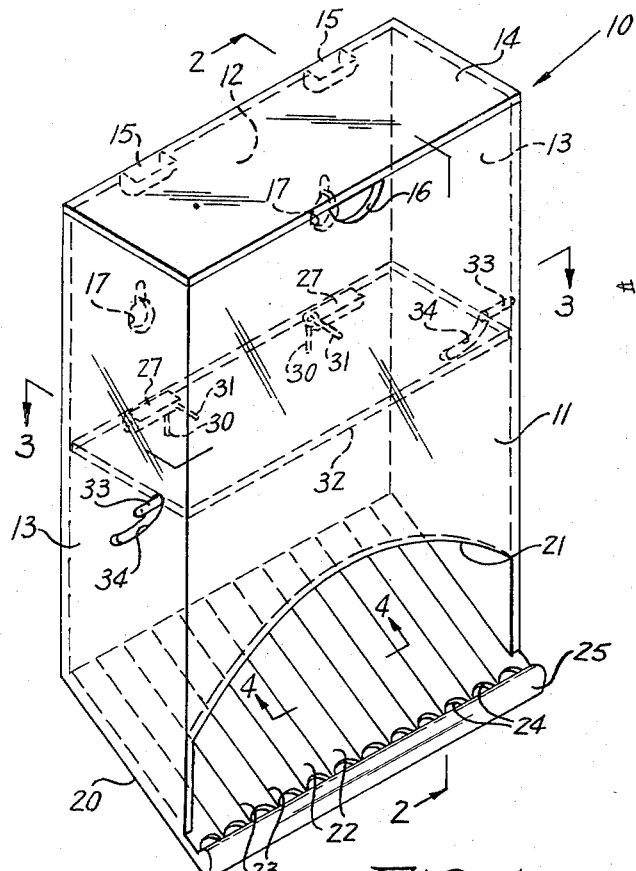
Figure 1 is a perspective view of one form of soap container embodying features of the instant invention.

Having reference now to the drawings in detail, and more particularly to Figures 1 to 5 inclusive, the device of the instant invention comprises a receptacle generally indicated at 10, which includes a front wall 11, a rear wall 12 and end walls 13. A top 14 is hinged as by means of hinges 15, to the top of rear wall 12, and is adapted to be lifted, to a vertical position, as indicated in dotted lines in Fig. 2 for a purpose to be more fully described hereinafter. A finger opening 16 is provided in the front wall 11. The rear wall 12 is provided with a pair of spaced apart keyhole slots 17, which are adapted to engage over the heads of suitable screws 18, adapted to be secured to a wall or similar surface.

Figure 2:
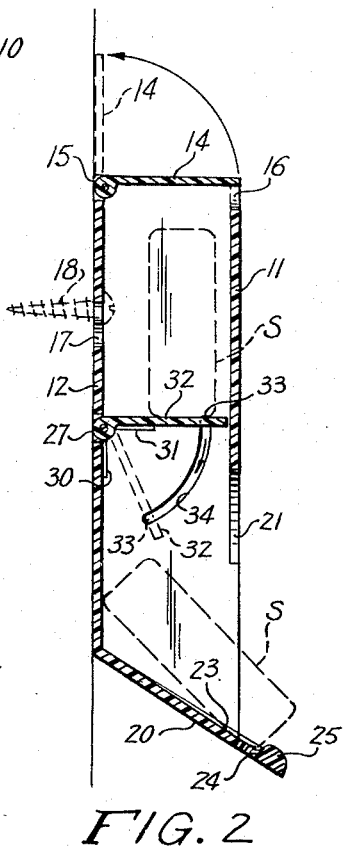
Fig. 2 is a sectional view taken substantially along the line 2—2 of Fig. 1.
Figure 3:
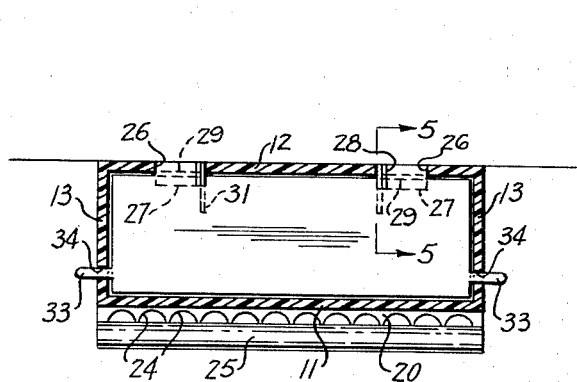
Fig. 3 is a sectional view taken substantially along the line 3—3 of Fig. 1 as viewed in the direction indicated by the arrows.
Figure 4:
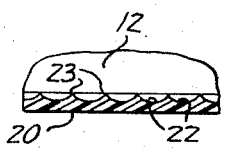
Fig. 4 is a fragmentary sectional view taken substantially along the line 4—4 of Fig. 1 as viewed in the direction indicated by the arrows.

The bottom of the receptacle 20 is inclined, as best shown in Fig. 2, outwardly from the rear wall 12 towards the front wall 11, the latter being provided with a relatively large opening 21 at its lower portion, through which the soap may be removed. The bottom surface 20 is provided with a plurality of channels 22, which provide ridges 23 for supporting the soap, but leaving suitable drainage space therebeneath. At the front end of each channel 22 there is provided a drainage opening 24. A raised front bar 25, extends across the bottom adjacent its outer edge, to prevent the sliding of the cake of soap S entirely out of the receptacle, the dimensions of the opening 21 being sufficient to permit the ready manual removal of the soap when desired.

At a mid point of rear wall 12 above the top of the opening 21, there are provided a pair of spaced slots 26, adapted for the reception of the barrel 27 of a spring hinge, the latter including a coil 28 wound about a pin 29 carried by the barrel 27, and a pair of spring fingers or leaves 30 and 31, respectively.

Each spring finger 30 lies against the inner side of the rear wall 12, while each spring finger 31 extends outwardly beneath a tiltable shelf 32, which extends entirely across the interior of the receptacle to the front wall 11. The shelf 32 is provided at either extremity with pins 33, which extend outwardly through arcuate slots 34 in the end walls 13, the arrangement being such that upon depression of either pin 33 the shelf 32 is tilted to the dotted line position disclosed in Fig. 2, to permit the soap which is positioned normally on the shelf 32 to fall to the bottom 20 of the device. The strength of the spring leaves 30 and 31 is normally sufficient to hold the shelf 32 in its horizontal position, upward movement thereof being limited by the engagement of the pins 33 with the uppermost ends of the slot 34, and the springs are of sufficient strength to support a cake of soap of normal or average weight.

In the use and operation of the device, obviously the lid 14 is raised, and the soap S deposited through the top of the device to rest on the shelf 32. When it is desired to use the shelf, either of pins 33 is moved downwardly in its associated arcuate slot 34 to permit the soap to drop onto the inclined bottom wall 20. The soap may then be removed through the opening 21, and employed as desired, and upon completion of its use, the lid 14 may again be raised, and the soap redeposited on the shelf 32, it being noted that the shelf 32 is automatically returned to its horizontal position by the spring fingers 30 and 31, upon release of the finger grasp on pin 33.

Figures 6 and 7 disclose a modified form of the device, which is substantially identical to the previously described device, with the exception that provision is made for two separate cakes of soap. In this modification, the dual device is generally indicated at 10a, and includes a front wall 11a, a rear wall 12a, and end walls 13a. The rear wall 12a is substantially identical to the wall 12, except that it is of a greater width, and includes keyhole slots 17a.

Two separate covers 14a are provided, of equal extent, and are hinged to back wall 12a by means of pairs of hinges 15a. Two finger apertures 16a are provided in the front wall 11a whereby either lid 14a may be independently lifted. The rear wall 12a is also provided with two pairs of slots 26a, each of which is adapted to contain a hinge barrel 27a, each hinge barrel being provided with spring fingers, substantially identical to the fingers 30 and 31 previously described. The hinges support two separate shelves 32a, which are substantially identical to the shelves 32, with the exception of the fact that each is provided with only one pin 33a at its outer end, rather than the two pins 33 of the shelf 32. Arcuate slots 34a are provided in each end wall 13a. The front wall 11a is provided with an aperture or opening 21a, which extends substantially the full width thereof, and the base or bottom 20a includes channels 22a, ridges 23a and drainage holes 24a, together with the stop bar 25a, all substantially identical to that of the preceding modification. In this modification, however, there is provided a central partition 40 which divides the receptacle 10a into two substantially identical compartments. The partition 40 is provided with a shoulder 41, which is adapted to rest beneath the top of the opening 21a.

The partition 40, extending upwardly from the bottom 20a and also extending between the lids or hinged covers 14a which effectively divides the device into two compartments, each having an independent tiltable shelf, whereby a cake of soap resting on either of shelves 32a may be dropped by movement of the associated pin 33a in a manner substantially identical to that in the previously described modification.

In the design and assembly of this device, it has been found preferable to make the device of Figure 1 of a size to accommodate a large or giant size cake of soap, while the device of Figs. 6 and 7 may be reduced in overall dimensions, in order to accommodate the conventional sized cake of soap.

From the foregoing, it will now be seen that there is herein provided a device which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

What is claimed is:

1. In a device of the character described, a soap container and dispensing device including a transparent receptacle, including front, rear and end walls, said rear wall having a pair of keyhole openings therein adapted to engage supporting screws, a hinged lid for said receptacle, a forwardly inclined bottom wall for said receptacle, said front wall having a relatively wide opening therein through which a cake of soap may be withdrawn, said rear wall having aligned slots therein, hinge barrels seated in said slots, spring leaves carried by said hinge barrels, a shelf carried by said spring leaves normally biased to horizontal position, each of said end walls having an arcuate slot therein, a pin secured to an end of said shelf extending through each of said slots whereby manual movement of either of said pins tilts said shelf downwardly to allow a cake of soap carried thereby to fall to the inclined bottom of said receptacle.

2. The structure of claim 1 wherein a raised stop member extends across the lower end of said inclined bottom.

References Cited in the file of this patent
UNITED STATES PATENTS

| | | |
|---|---|---|
| 1,211,353 | Rantzenburg | Jan. 2, 1917 |
| 2,175,753 | Guthmann | Oct. 10, 1939 |
| 2,269,303 | Backstorm | Jan. 6, 1942 |
| 2,602,584 | Croft | July 8, 1952 |